United States Patent [19]

Lew

[11] Patent Number: 4,884,441
[45] Date of Patent: Dec. 5, 1989

[54] VARIABLE CAPACITY FLOWMETER

[76] Inventor: Hyok Sang Lew, 7890 Oak St., Arvada, Colo. 80005

[21] Appl. No.: 192,836

[22] Filed: May 11, 1988

[51] Int. Cl.$^4$ ............................................. G01F 7/00
[52] U.S. Cl. ....................................... 73/195; 73/203; 73/861.02; 73/861.24; 73/861.38
[58] Field of Search ................... 73/195, 197, 861.02, 73/861.03, 861.24, 861.22, 203, 861.38

[56] References Cited

U.S. PATENT DOCUMENTS

| | | | |
|---|---|---|---|
| 3,776,033 | 12/1973 | Herzl | 73/861.22 |
| 3,803,912 | 4/1974 | Ohno | 73/197 X |
| 4,048,854 | 9/1977 | Herzl | 73/861.02 |
| 4,339,957 | 7/1982 | Herzl | 73/861.24 |
| 4,475,405 | 10/1984 | Corpron et al. | 73/861.24 |
| 4,491,025 | 1/1985 | Smith et al. | 73/861.38 |
| 4,561,310 | 12/1985 | Barnard et al. | 73/861.02 |
| 4,616,509 | 10/1986 | Feller | 73/861.05 |
| 4,653,321 | 3/1987 | Cunningham et al. | 73/197 |
| 4,727,756 | 3/1988 | Lew | 73/861.24 |
| 4,730,501 | 3/1988 | Levien | 73/861.38 |
| 4,738,143 | 4/1988 | Cape et al. | 73/861.38 |

FOREIGN PATENT DOCUMENTS 55-48612 4/1980 Japan.
58-201026 11/1983 Japan.

Primary Examiner—Herbert Goldstein

[57] ABSTRACT

The flowmeter of the present invention comprises at least two separate flow passages wherein one of the two flow passages include a shut-off valve with an actuator and the other of the two passage includes a flow rate sensor for measuring flow rate through that flow passage. In the mode of full capacity operation, both of the two flow passages stay fully open and the flow rate through the two flow passages is determined from the flow rate sensor measuring the flow through one of the two flow passages by multiplying by a factor such as two. In the mode of reduced capacity operation, the shut-off valve shuts off one of the two flow passages and the flow rate is directly determined from the flow rate sensor. The actuator actuating the shut-off valve may be controlled by the amplitude of the electric signals representing the flow rate wherein the valve is shut automatically when the amplitude of the flow signal is less than a preset threshold value and is opened automatically when the amplitude of the flow signal is greater than the threshold value, or it may be operated manually.

26 Claims, 3 Drawing Sheets

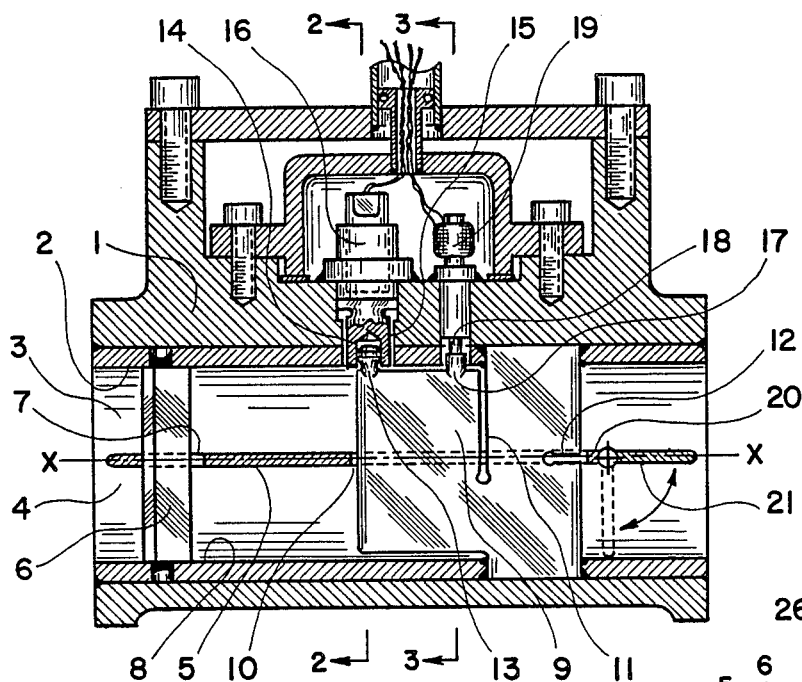
Fig. 1
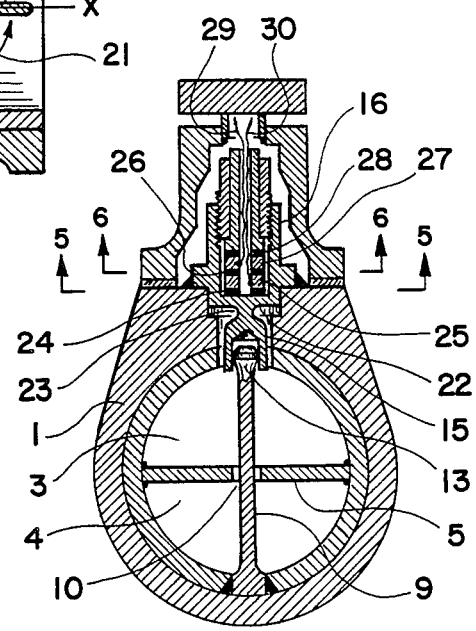
Fig. 2
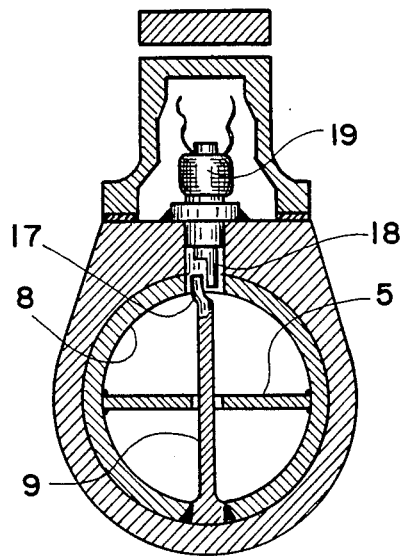
Fig. 3
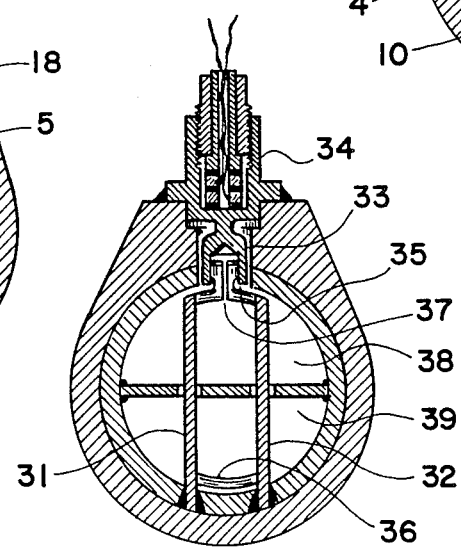
Fig. 4
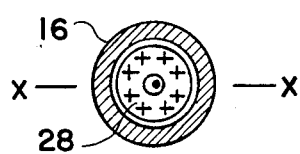
Fig. 6
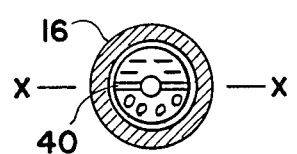
Fig. 5
Fig. 7

VARIABLE CAPACITY FLOWMETER

BACKGROUND OF THE INVENTION

The true challenge in inventing a new flowmeter or designing one based on an existing principle of operation arises from the requirement that a good flowmeter has to measure low fluid velocities reliably and accurately. The intensity of kinematic or fluid dynamic signals employed in the determination of the flow rate fades away as the flow velocity becomes lower and lower. As a consequence, no mater how good a transducer converting the fluid mechanical signals to the electrical signals is, there is always a minimum flow velocity of a finite magnitude below which minimum velocity the flowmeter fails to measure the flow rate. The goal in the advancement of the flow measurement technology is to find a method or principle that lowers the minimum value of measurable flow velocity as much as possible, as the versatility as well as the accuracy of the flowmeter is usually indicated by the ability of the flowmeter to measure the possibly lowest value of the flow velocity. The conventional wisdom suggests that one should select the most pronounced form of the fluid dynamic signals and employ the most sensitive transducer converting the fluid dynamic signals to electric signals. Once the most sensitive transducer is employed to measure the most pronounced form of the fluid dynamic signals in the construction of a flowmeter, does it imply that the dead end of the technology is reached?

BRIEF SUMMARY OF THE INVENTION

The primary object of the present invention is to provide a variable capacity flowmeter with two or more flow passages, wherein at least the first of the two flow passages includes a flow rate sensor measuring the flow rate, through the first flow passage, while the second of the two flow passages includes a shut-off valve that shuts-off the second flow passage when the intensity of the signals from the flow rate sensor is lower than a preset threshold value and opens when the intensity of the signals from the flow rate sensor is higher than the threshold value.

Another object is to provide a variable capacity flowmeter wherein the shut-off valve closing one of the two flow passages is automatically operated by a controller using the intensity of the fluid dynamic signals as an input thereto.

A further object is to provide a variable capacity flowmeter wherein the shut-off valve is manually operated.

Yet another object is to provide a variable capacity flowmeter wherein the two separate flow passages have the same resistance against the fluid flow and equal amounts of fluid flow respectively move through the two separate flow passages when the shut-off valve is fully open.

Yet a further object is to provide a variable capacity flowmeter with a flow rate sensor comprising means for generating vortices and means for detecting vortex shedding frequency as a measure of fluid velocity and for detecting the intensity of the vortices as a measure of the dynamic pressure of the fluid flow.

Still another object is to provide a variable capacity flowmeter with a flow rate sensor comprising one or more rotating elements such as a turbine, paddle or propeller, wherein the fluid velocity is determined from the rate of rotation of the rotating element.

Still a further object is to provide a variable capacity flowmeter with a flow rate sensor comprising a heated probe that determines the flow rate from the rate of convective heat transfer therefrom to the moving fluid.

Yet still another object is to provide a variable capacity flowmeter comprising two parallel loops of conduits respectively providing the two separate flow passages wherein the two parallel loops of conduits are vibrated relative to one another at the midsections thereof and the flow rate is determined from the difference in the relative vibratory motions of the conduits between the upstream and downstream halves of the conduits.

These and other objects of the present invention will become clear as the description thereof progresses.

BRIEF DESCRIPTION OF THE FIGURES

The present invention may be described with a great clarity and specificity by referring to the following figures:

FIG. 1 illustrates a cross section of an embodiment of the variable capacity flowmeter of the present invention operating on the principles of a vortex shedding flowmeter.

FIG. 2 illustrates another cross section of the embodiment shown in FIG. 1.

FIG. 3 illustrates a further cross section of the embodiment shown in FIG. 1.

FIG. 4 illustrates a cross section equivalent to that shown in FIG. 2, which shows an alternative arrangement of the vortex sensor.

FIG. 5 illustrates a first cross section of an embodiment of a transducer detecting the vortices, that is included in the embodiment shown in FIG. 1, 2 and 3.

FIG. 6 illustrates a second cross section of the embodiment of the transducer detecting vortices.

FIG. 7 illustrates a cross section equivalent to that shown in FIG. 5, which illustrates an alternative arrangement replacing that shown in FIG. 5.

DESCRIPTION OF THE ILLUSTRATED EMBODIMENTS

Figure 8:
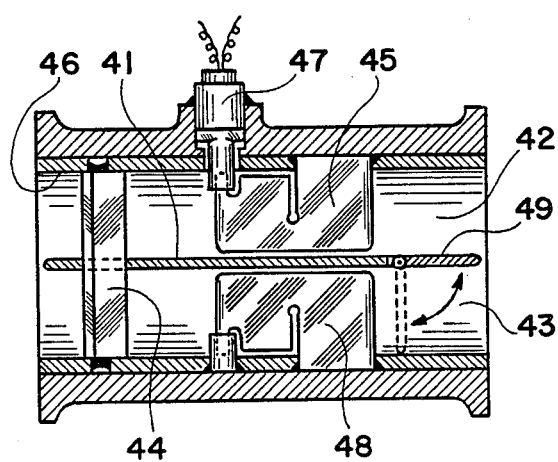
FIG. 8 illustrates a cross section of another embodiment of the variable capacity flowmeter of the present invention operating on the principles of a vortex shedding flowmeter.

In FIG. 1 there is illustrated a cross section of an embodiment of the variable capacity vortex shedding flowmeter constructed in accordance with the principles of the present invention. The valve body 1 includes a bore 2 extending from one extremity to the other extremity of the valve body 1, which bore is divided into two flow passages 3 and 4 having a semicircular cross section by a divider plate 5 disposed on a plane generally including the central axis X—X of the bore 1. A vortex generator 6 of an elongated cylindrical shape is disposed across a first cross section of the bore 1 in a generally perpendicular angle to the divider plane 5, which extends through the clearance opening 7 disposed through the divider plate 5, wherein the two extremities of the vortex generator or bluff body 6 are affixed to the wall 8 of the bore 2. A vortex sensor 9 of a planar shape is disposed across a second cross section of the bore 1, which extends through a clearance opening 10, wherein the two extremities of the vortex sensor or vane 9 are secured to the wall 8 of the bore 2 at least in part. The upstream portion of the vane 9 extending from the secured downstream portion thereof may be separated partially from the downstream portion by a slit 11 extending from a midsection of the vane 9 to one extremity thereof. The midsection of the vane 9 may include another slit 12 open to the trailing edge thereof, which slit 12 is disposed on a plane generally including the divider plate 5. The upstream portion of one extremity of the vane 9 not secured to the wall 8 of the bore 2 includes the first half 13 of a mechanical coupling such as a post or ball joint, which engages the second half 14 of the mechanical coupling such as a socket or slot in a close tolerance relationship. The socket 14 is included in a force receiving member 15 extending from an end wall of a transducer container vessel 16 rigidly affixed to the flowmeter body 1. The upstream portion of one extremity of the vane 9 not secured to the wall 8 of the bore 2 may also include a ferromagnetic element 17 disposed adjacent to an extremity of the core 18 of the electromagnet 19 in a closely spaced arrangement. The downstream edge 20 of the divider plate 5 includes a flap valve 21 that is operated by an actuator which is not shown in the illustration. When the flap valve 20 is turned to the closed position as marked by the broken outline thereof, it completely blocks fluid flow through the second flow passage 4. The clearance opening 7 provides pressure communication between the two flow passages 3 and 4 in the neighborhood of the bluff body 6, which enhances the vortex shedding in unison over the entire longth of the bluff body when both of the two flow passages 3 and 4 are open.

In FIG. 2 there is illustrated another cross section of the embodiment shown in FIG. 1, which cross section is taken along plane 2—2 as shown in FIG. 1. The transducer container vessel 16 includes a thin end wall 22 with a rib 23 extending therefrom and disposed parallel to the central axis X—X of the bore 2, which rib extends to the force receiving member 15. The force receiving member 15 extends through a clearance hole disposed through the wall 8 of the bore 2. The transducer container vessel 16 contains a stacked combination of the transducer elements including a first Piezo electric disc 24, a first metallic electrode disc 25, an insulator disc 26, a second metallic electrode disc 27, and a second Piezo electric disc 28, which stacked combination is pressed against the thin end wall 22 by a plug threadedly engaging the open end of the transducer container vessel 16. A pair of conducting wires 29 and 30 respectively extend from the two metallic electrode discs 25 and 27.

In FIG. 3 there is illustrated a further cross section of the embodiment shown in FIG. 1, which cross section is taken along plane 3—3 as shown in FIG. 1. The ferromagnetic element 17 affixed to the upstream portion of one extremity of the vane 9 not secured to the wall 8 of the bore 2 is disposed adjacent to the shaved end of the core 18 of the electromagnet 19 in a closely spaced arrangement. The core 18 extends through a hole disposed through the wall 8 of the bore 2 in a leak-proof arrangement.

In FIG. 4 there is illustrated a cross section equivalent to that shown in FIG. 2, which shows an alternative arrangement of the vortex sensor, that comprises two vanes 31 and 32 having the same construction as the vane 9 shown in FIGS. 1 and 2, which vanes are independently connected to the force receiving member 33 extending from the transducer assembly 34 by a mechanical coupling 35. A dummy support 36 is included to simulate the mechanical coupling support 37, which arrangement provides two identical flow passages 38 and 39 providing equal amounts of flow therethrough.

In FIG. 5 there is illustrated a cross section of the transducer assembly taken along plane 5—5 as shown in FIG. 2, which cross section shows the first Piezo electric disc 24 sandwiched between the thin metallic end wall 22 and the first metallic electrode disc 25. The first Piezo electric disc 24 has two oppositely polarized halves disposed generally symmetrically about a plane parallel to the central axis X—X of the bore 2.

In FIG. 6 there is illustrated another cross section of the transducer assembly taken along plane 6—6 as shown in FIG. 2, which shows the second Piezo electric disc 28 sandwiched between the second metallic electrode disc 27 and the end face of the metallic plug threadedly plugging up the open end of the transducer container vessel 16. The second Piezo electric disc 28 has the same polarization for both halves.

In FIG. 7 there is illustrated a cross section of a transducer assembly equivalent to that shown in FIG. 5. The Piezo electric disc 24 of two oppositely polarized halves shown in FIG. 5 can be replaced with a Piezo electric disc 40 with only one polarized half, wherein the polarized and unpolarized half are separated by a plane generally parallel to the central axis X—X of the bore 2.

The bluff body 6 generates a train of vortices shed from the two sides thereof in an alternating pattern. The vortices shed from the bluff body 6 creates sinuating streamlines in the downstream region, which sinuating streamlines exert alternating lift force on the vane 9, wherein the frequency of the alternating lift force is the same as the vortex shedding frequency that is proportional to the fluid velocity, and the amplitude of the alternating lift force is generally proportional to the dyamic pressure of the fluid flow that is equal to the one half of the fluid density times the square of the velocity. The transducer assembly converts the alternating lift force on the vane 9 to alternating electromotive force. The volume flow rate is determined from the frequency of the alternating electromotive force by using the constant of proportionality therebetween determined empirically, and the mass flow rate is determined from the frequency and amplitude of the alternating electromotive force by using another empirically determined constant of proportionality relating the amplitude of the alternating electromotive force to the dynamic pressure of the fluid flow. Once the volume flow and the mass flow are determined, the fluid density can be determined as a ratio thereof. While the frequency measurement is independent of the change in the mechanical characteristics of the combination of the vane and the transducer assembly and the change in the electric characteristics of the Piezo electric crystal elements, the amplitude measurement depends on the change in the aforementioned characteristics. The electromagnet 19 energized with a pulsed electric current of known amount exerts a lateral impulse of known magnitude on the vane 9 which generates pulsed electromotive force from the transducer assembly. By intermittently or continuously updating the ratio of the known magnitude of the impulse exerted on the vane 9 by the electromagnet 19 over the amplitude of the electromotive force generated thereby, the algorithm that determines the dynamic pressure of the fluid flow from the electromotive force from the transducer is up-dated and, consequently, the mass flow rate and the fluid density can be determined accurately independent of the drift in the mechanical and electrical characteristics of the vortex sensing apparatus. The aforementioned up-dating process as well as the algorithm that determines the volume and mass flow rates and the fluid density from the vortex signals are performed by a microprocessor. When the fluid velocity falls below a preset threshold value wherein the intensity of the vortex signals is too weak to be conditioned and processed, the shut-off valve closes. As the number of flow passages is reduced from two to one, the fluid velocity goes up and the intensity of the vortex signal increases. Therefore, blocking one of the two flow passages enables the variable capacity flowmeter of the present invention to measure low flow rates which can not be measured by a flowmeter of fixed capacity. The constants of proportionality respectively relating the frequency and amplitude of the alternating electromotive force generated by the vortex shedding to the volume and mass flow rates are shifted down from the empirically determined values for the full capacity operation mode to the empirically determined values for the reduced capacity operation mode when the shut-off valve closes one of the two flow passages, which reduction in the numerical values of the constants of proportionality may be equal to 50 percent or other values close to 50 percent.

In FIG. 8 there is illustrated a cross section of another embodiment of the variable capacity vortex shedding flowmeter of the present invention, which has construction generally similar to the embodiment shown in FIGS. 1, 2 and 3 with a few exceptions. The divider plate 41 dividing the bore 42 into the two flow passages 42 and 43 does not have any openings or gaps as the bluff body 44 extends through the divider plate 41 in a generally leak-proof arrangement. The real vortex sensor or vane 45 secured to the wall of the bore 46 at the trailing edge portion of one extremity thereof extends across a cross section of the first flow passage 42 and is terminated near the divider plate 41. The unsecured leading edge portion of the vane 45 partially separated from the trailing edge portion thereof by a slit is connected to the force receiving member of a transducer 47 in the same arrangement as described in conjunction with FIGS. 1 and 2. The second flow passage 43 has a dummy vortex sensor or vane 48 disposed in a mirror image to the real vortex sensor 45 about the divider plate 41. In the reduced capacity mode of operation, the shut-off valve 49 closes the second flow passage 43.

Figure 9:
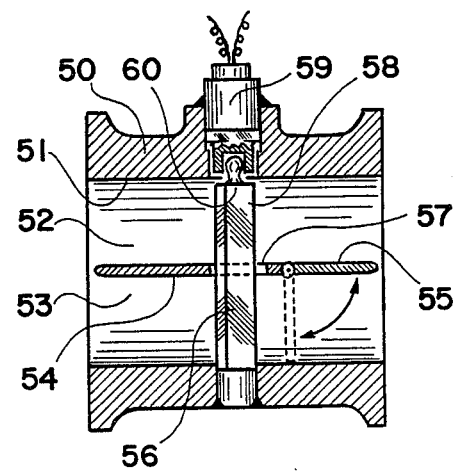
FIG. 9 illustrates a cross section of a further embodiment of the variable capacity flowmeter of the present invention operating on the principles of a vortex shedding flowmeter.

In FIG. 9 there is illustrated a cross section of a further embodiment of the variable capacity vortex shedding flowmeter of the present invention, which embodiment comprises a vortex generator-sensor. The flowmeter body 50 includes a bore 51 which is divided into two flow passages 52 and 53 of equal cross sectiond area by a divider plate 54. A shut-off valve 55 is disposed at the downstream edge of the divider plate 54, that closes the second flow passage 53 in the reduced capacity operation mode, while it stays fully open in the full capacity operation mode. The vortex generating bluff body 56 fixedly secured to the wall of the bore 51 at one extremity thereof disposed within the second flow passage 53 extends through a clearance hole 57 included in the divider plate 54 and across the first flow passage 52. The free end 58 of the bluff body 56 disposed in a cantilever arrangement across both of the two flow passages 52 and 53 is connected to the force receiving member of the transducer assembly 59 by a mechanical coupling 60. It should be understood that the connection by mechanical coupling 60 can be replaced with a fixed connection and the fixed securement of the bluff body to the wall of the bore can be replaced with a simple securement or left as a free end unconnected to the wall. The variable capacity vortex shedding flowmeter shown in FIG. 9 operates on the same principles as the vortex shedding flowmeter shown in FIGS. 1 or 8.

Figure 10:
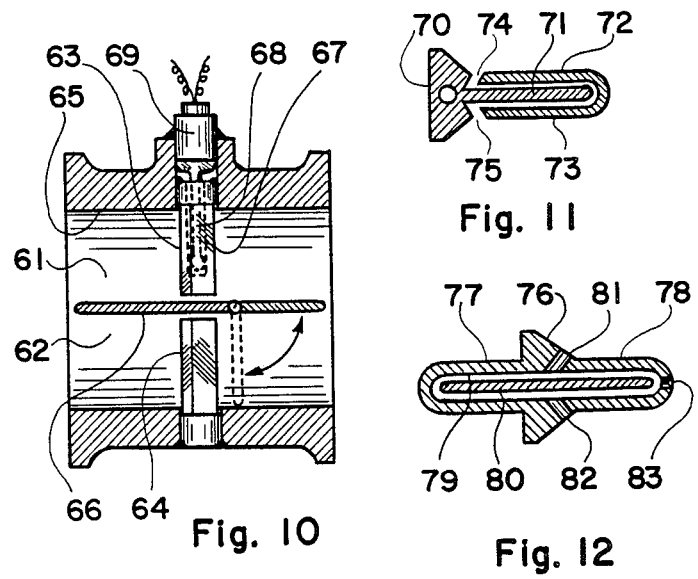
FIG. 10 illustrates a cross section of yet another embodiment of the variable capacity flowmeter of the present invention operating on the principles of a vortex shedding flowmeter.

In FIG. 10 there is illustrated a cross section of yet another embodiment of the variable capacity vortex shedding flowmeter of the present invention, which has a construction similar to the embodiment shown in FIG. 9 with a few exceptions. The two flow passages 61 and 62 have two separate vortex generators 63 and 64, which are fixedly secured to the wall of the bore 65 and extends towards the divider plate 66 in a cantilever arrangement. The bluff body 63 included in the first flow passage 61, that stays open all the time, includes a longitudinal blind hole 67, which is engaged by an elongated force receiving member 68 extending from the transducer assembly 69. The elongated force receiving member 68 engages the hole 67 in a clearance relationship, while its free end is made to fit tightly into the blind end portion of the hole 67. The variable capacity vortex shedding flowmeter shown in FIG. 10 operates on the same principles as the flowmeters shown in FIGS. 1, 8 or 9.

Figure 11:
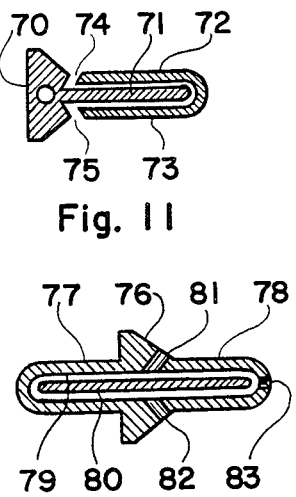
FIG. 11 illustrates a cross section of an embodiment of the vortex generator-sensor usable in conjunction with the embodiments shown in FIG. 9 or 10.

In FIG. 11 there is illustrated a cross section of a further embodiment of the vortex generator-sensor combination disposed across one or both of the two flow passages as shown in FIG. 9 or 10, which cross section is taken along a plane parallel to the divider plate. The bluff body 70 has a planar trailing edge 71 extending therefrom towards the downstream direction, wherein the two sides of the planar trailing edge 71 are shielded from the moving fluid by pressure shield plates 72 and 73, respectively. The two sides of the planar trailing edge 71 are respectively exposed to the alternatively floctuating pressure of the fluid associated with the vortex shedding from the two sides of the bluff body 70 in an alternating pattern through the pressure openings 74 and 75. In the installation of the vortex generator-sensor combination, the pressure shield plates 72 and 73 or combination thereof having a U-shaped cross section is secured to the wall of the flow passages at one or both extremities thereof, and the combination of the bluff body 70 and the planar trailing edge 71 is secured to one wall of the flow passage at one extremity and coupled to the force receiving member of the transducer assembly in an arrangement similar to that shown in FIG. 9 or 10. Of course, it should be mentioned that one extremity of the vortex generator-sensor combination can be fixedly connected to the force receiving member of the transducer assembly, while the other extremity is simply connected to the wall of the flow passage or left as a free end in a cantilever fashion which is an alternative to the arrangement shown in FIG. 9 or 10 in installing the vortex generator-sensor combination in the flow passage.

Figure 12:
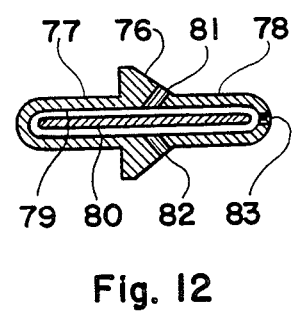
FIG. 12 illustrates a cross section of another embodiment of the vortex generator-sensor usable in conjunction with the embodiment shown in FIG. 9 or 10.

In FIG. 12 there is illustrated a cross section of yet another embodiment of the vortex generator-sensor combination disposed across one or both of the two flow passages as shown in FIG. 9 or 10, which cross section is taken along a plane parallel to the divider plate. The bluff body 76 has leading edge planar member 77 and a trailing edge planar member 78, which combination includes a planar cavity 79 extending from the upstream edge of the leading edge planar member 77 to the downstream edge of the trailing edge planar member 78, that houses a planar member 80 isolated from the wall of the planar cavity 79 all around by narrow gaps. The two sides of the planar panel 80 are respectively exposed to the fluctuating fluid pressure associated with the vortex shedding through the pressure openings 81 and 82 disposed following the length of the vortex generator-sensor combination. In the installation within the flow passage, the combination of the bluff body 76 and planar extensions 77 and 78 is affixed to the wall of the flow passage at one or both extremities thereof, while one extremity of the planar member 80 is fixedly or simply connected to the force receiving member of the transducer assembly. It should be mentioned that the vortex generator-sensor combination works quite well even when one of the two planar extensions 77 and 78 is omitted. The trailing edge of the planar extension member 78 may include openings 83 to purge the debris trapped in the planar cavity 79.

Figure 13:
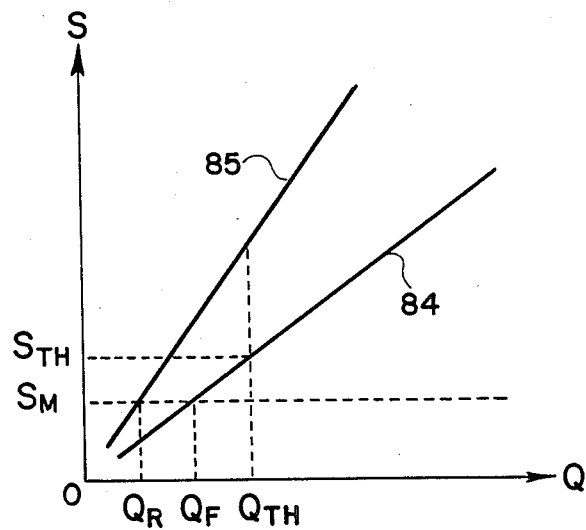
FIG. 13 illustrates a relationship between the fluid velocity and flow signals generated thereby, which shows the shifting of the relationship between the full capacity and the reduced capacity operating modes of the variable capacity flowmeter of the present invention.

In FIG. 13 there is illustrated operating principles of the variable capacity flowmeter of the present invention, wherein the abscissa and the ordinate respectively represent the fluid flow rate and the amplitude of the flow signal employed in the flow measurement. The line or curve 84 represents the relationship between the flow rate Q and the signal amplitude S for the full capacity operation wherein both flow passages are fully open, while the line or curve 85 represents the same relationship for the reduced capacity operation wherein one of the two flow passages are completely closed. The minimum signal amplitude $S_M$ is the lowest amplitude of the flow signal that can be distingushed from noises. The minimum flow rate measurable with a fixed capacity flowmeter of the variable capacity flowmeter operating at the full capacity is $Q_F$. In the variable capacity flowmeter of the present invention, the mode of operation changes from the full capacity operation to the reduced capacity operation when the flow rate becomes equal to or less than a threshold value $Q_{TH}$ that generates the threshold signal amplitude $S_{TH}$ that is set slightly higher than the minimum processable signal amplitude $S_M$, whereupon the flow velocity increases by 100 percent as the cross section of the total flow passages is reduced by 50 percent and, consequently, the flow curve switches from 84 to 85. The minimum flow rate measurable by the variable capacity flowmeter operating at the reduced capacity is $Q_R$ that puts out signal amplitude $S_M$. The minimum meaurable velocity of any existing flowmeters can be easily lowered to one half of that value by employing the teaching of the present invention, which transforms average flowmeters to outstanding flowmeters and good flowmeters to superflowmeters. Of course, the bore through the flowmeter can be divided into more than two separate flow passages of equal flow resistance wherein the flowmeter can be operated at the reduced capacity after closing all flow passages except one, which arrangement can reduce the minimum measurable velocity by many hundred percent. The transition from the full capacity operation to the reduced capacity operation and vice versa can be carried out manually or automatically. Manual transition requires manual closing and opening of the shut-off valve in the second flow passage. In automatic transition, the shut-off valve in the second flow passage is automatically shut or opened by an actuator controlled by the flow signal amplitude, wherein the valve automatically shuts when the flow signal is less than the preset threshold value $Q_{TH}$ and automatically opens when the flow signal is greater than the threshold value $Q_{TH}$.

Figure 14:
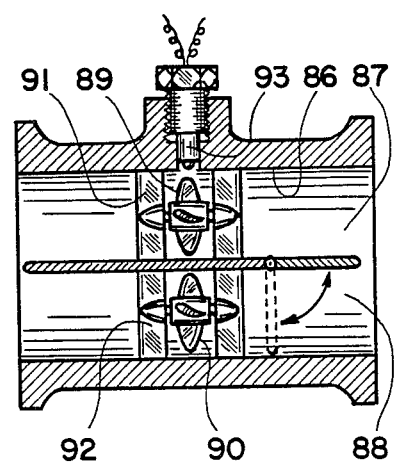
FIG. 14 illustrates a cross section of an embodiment of the variable capacity flowmeter of the present invention operating on the principles of a turbine flowmeter.

In FIG. 14 there is illustrated a cross section of an embodiment of the variable capacity turbine flowmeter of the present invention. The bore 86 includes two separate flow passages 87 and 88, wherein the cross section of each of the two flow passages changes from a semicircle at the inlet section to a full circle at the section where the turbines 89 or 90 are disposed. The turbines 89 and 90 are rotatably supported by spider vanes 91 and 92, respectively. At least one of the two flow passages 87 and 88 includes a transducer 93 that accounts the angular velocity of the turbine 89. The bore 86 may include more than two separate flow passages wherein all flow passages except one are closed in the reduced capacity operation. The turbines can be readily replaced with the paddles in constructing a variable capacity paddle flowmeter, which construction is not separately illustrated as the use of paddles in place of the turbines is a matter of design well known in the existing art of the flowmeter. The variable capacity flowmeter shown in FIG. 14 operates on the same principles as those described in conjunction with FIG. 13, wherein the transition in the operating capacity is now controlled by the angular velocity of the turbine instead of the flow signal amplitude.

Figure 15:
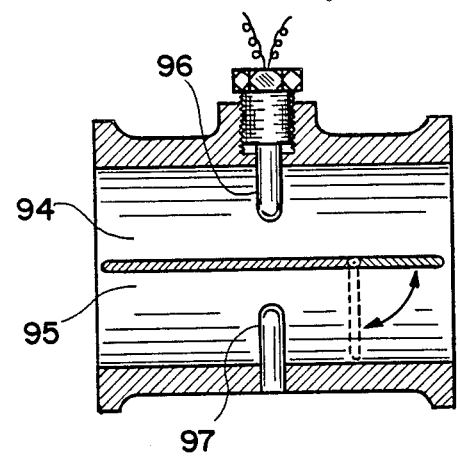
FIG. 15 illustrates a cross section of an embodiment of the variable capacity flowmeter of the present invention operating on the principles of a heated probe mass flowmeter.

In FIG. 15 there is illustrated a cross section of an embodiment of the variable capacity hot probe type flowmeter of the present invention, which comprises two flow passages 94 and 95 respectively including a real hot probe 96 and a dummy hot probe 97, wherein the mass flow rate is determined by measuring the amount of the convective heat transfer from the hot probe to the moving fluid. The bore through which the fluid flows may include more than two separates flow passages wherein all flow passages except the one with the real hot probe are closed in the reduced capacity operation. The variable capacity convective heat transfer flowmeter shown in FIG. 15 operates on the same principles as those described in conjunction with FIG. 13.

Figures 16, 17:
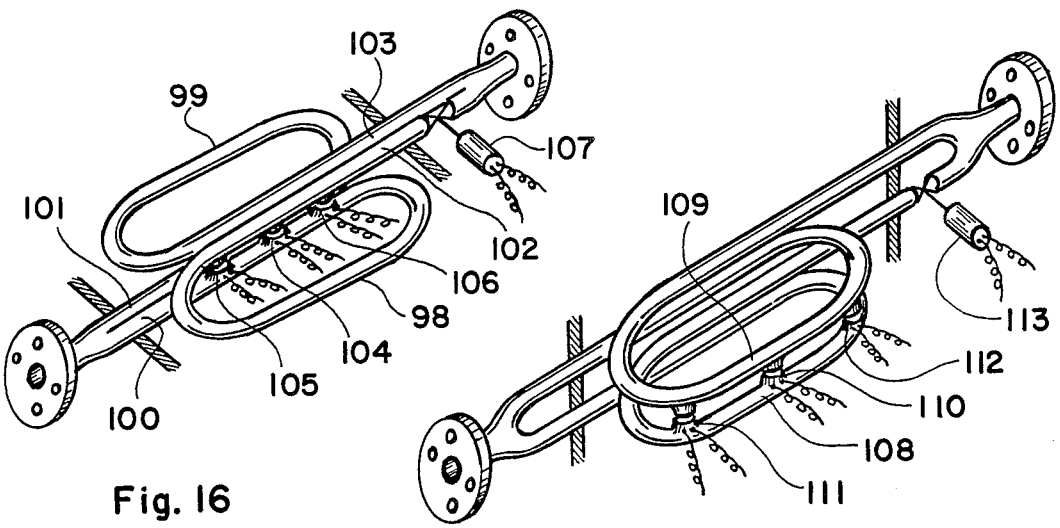
FIG. 16 illustrates a perspective view of an embodiment of a variable capacity Coriolis force flowmeter employing two 360 degree loops of conduit disposed in a symmetric arrangement.
FIG. 17 illustrates a perspective view of another embodiment of a variable capacity Coriolis force flowmeter employing two parallel 360 degree loops of conduit.

In FIG. 16 there is illustrated a perspective view of an embodiment of the variable capacity convective inertia flowmeter of the present invention, which type flowmeter is traditionally known as the Coriolis force flowmeter. This embodiment includes a pair of 360 degree loops of conduits 98 and 99 with generally straight inlet sections 100 and 101 attached to one another and generally straight outlet sections 102 and 103 attached to one another, wherein the two 360 degree loops 98 and 99 are disposed symmetrically about a plane and the inlet and outlet sections disposed on the plane of symmetry are spaced from one another. An electromagnetic vibrator 104 exerts vibratory forces to the inlet and outlet sections, which generate relative flexural vibrations of the over-hanging sections of the inlet and outlet sections therebetween. The two motion detectors 105 and 106 disposed symmetrically about a section including the electromagnetic vibrator 104 detect the relative flexural vibrations between the inlet and outlet sections at two different sections. The mass flow rate through the conduits is determined from the difference in the flexural vibrations measured by the two motion detectors. The first flow passage comprising inlet section 100, loop section 98 and outlet section 102 includes a shut-off valve 107, that closes the first flow passage when the magnitude of the flow signal is smaller than a preset threshold value and opens when the former is greater than latter, which valve shifts flow measurement between the full and reduced capacities as described in conjunction with FIG. 13.

In FIG. 17 there is illustrated a perspective view of another embodiment of the variable capacity Coriolis force flowmeter comprising two 360 degree loops of conduits 108 and 109 disposed in a parallel arrangement, an electromagnetic vibrator 110, and two motion detectors 111 and 112. One of the two flow passage provided by the conduit 108 includes a shut-off valve 113 that shifts the flow measurement between the full and reduced capacity operations as described in conjunction with FIG. 13.

Figures 18, 19:
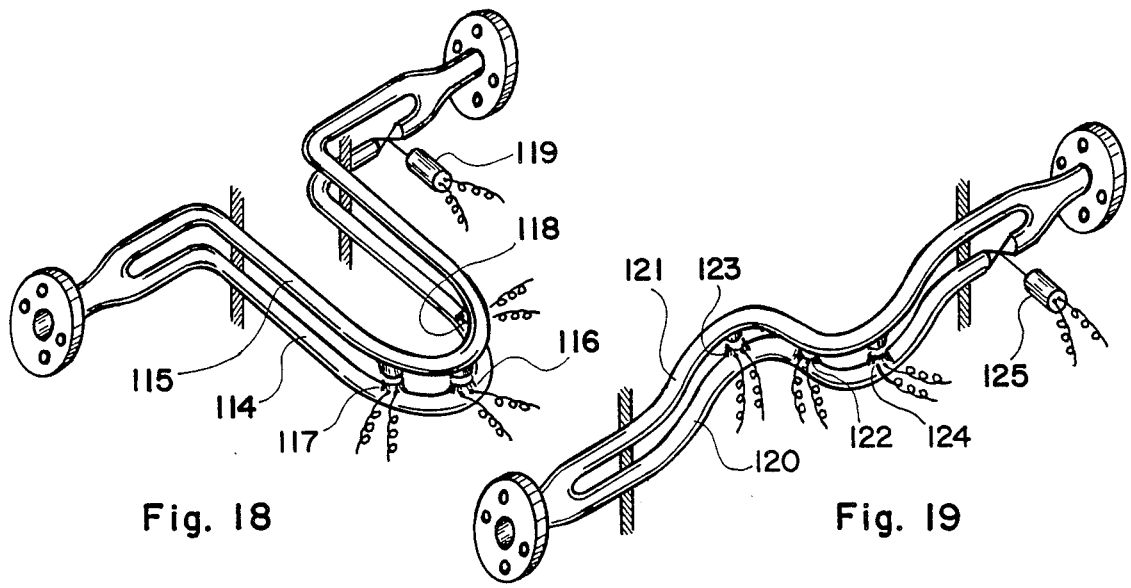
FIG. 18 illustrates a perspective view of a further embodiment of a variable capacity Coriolis force flowmeter employing two parallel U-shaped conduits.
FIG. 19 illustrates a perspective view of yet another embodiment of a variable capacity Coriolis force flowmeter employing two parallel S-shaped conduits.

In FIG. 18 there is illustrated a perspective view of a further embodiment of the variable capacity Coriolis force flowmeter comprising a pair of parallel U-shaped conduits 114 and 115, an electromagnetic vibrator 116, and two motion detectors 117 and 118. The shut-off valve 119 closing and opening the flow passage provided by the conduit 114 shifts the flow measurement between the full and reduced capacity operations as described in conjunction with FIG. 13.

In FIG. 19 there is illustrated a perspective view of yet another embodiment of the variable capacity Coriolis force flowmeter comprising a pair of parallel S-shaped conduits 120 and 121, an electromagnetic vibrator 122, and two motion detectors 123 and 124. The shut-off valve 125 closing and opening the flow passage provided by the conduit 120 shifts the flow measurement between the full and reduced capacity operations as described in conjunction with FIG. 13.

Figure 20:
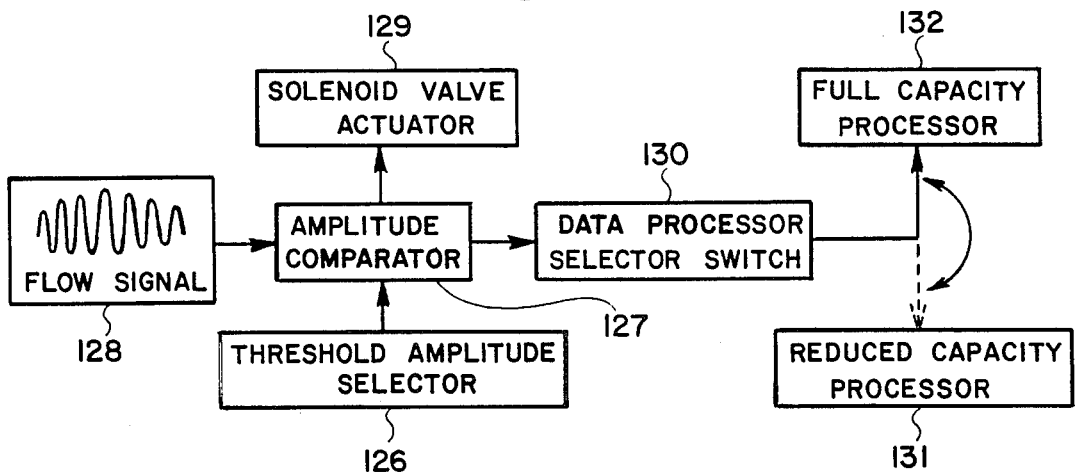
FIG. 20 illustrates a block diagram showing the control loop controlling the shift between the full capacity and reduced capacity mode of operations.

In FIG. 20 there is illustrated a block diagram showing the process controlling the mode of operation of the variable capacity flowmeter of the present invention. The threshold amplitude or frequency selector 126 is used to set the threshold value of the amplitude or frequency. The amplitude or frequency comparator 127 compares the flow signal amplitude or frequency from the flow sensor 128 to the threshold value set by the threshold value selector 126. If the flow signal is smaller than the threshold value, the signal comparator 127 activates the solenoid actuator 129 that closes one of the two flow passages and directs the data processor selector switch 130 to the reduced capacity data processor 131. If the flow signal is greater than the threshold value, the signal comparator 127 deactivates the solenoid actuator 129 and opens the shut-off valve, and directs the data processor selector switch 130 to the full capacity data processor 132.

It is evident that the principle of the variable capacity flowmeter taught by the present invention may employ any type of flow detectors including acoustic flow detectors, magnetic flow detectors, nuclear magnetic resonance flow detectors, paddle type flow detectors, force or displacement target flow detectors, positive displacement flow detectors, etc. in addition to the types of flow detectors described herein as illustrative embodiments.

While the principles of the present inventions have now been made clear by the illustrative embodiments, there will be immediately obvious to those skilled in the art many modifications of the structures, arrangements, proportions, elements and materials which are particularly adapted to the specific working environments and operating conditions in the practice of the invention without departing from those principles. It is not desired to limit the inventions to the particular illustrated embodiments shown and described and, accordingly, all suitable modifications and equivalents may be resorted to falling within the scope of the inventions as defined by the claims which follow.

The embodiments of the invention, in which an exclusive property or priviledge is claimed, are defined as follow:

1. An apparatus for measuring fluid flow comprising in combination:
   (a) a body including a bore extending from one extremity to the other extremity of the body;
   (b) a divider planar member disposed generally parallel to the central axis of the bore and dividing the bore into two flow passages;
   (c) shut-off means for closing and opening one of said two flow passages;
   (d) a vortex generator of an elongated cylindrical shape disposed across said two flow passages in a generally perpendicular relationship to the divider planar member and extending through a clearance opening disposed through the divider planar member wherein a gap between the vortex generator and boundary of the clearance opening allows communication of fluid pressure between the two flow passages;

(e) a vortex sensor of an elongated planar shape disposed across the two flow passages downstream of the vortex generator and extending through a clearance opening through the divider planar member, wherein at least one extremity of the vortex sensor is secured to the body at least in part; and (f) a transducer connected to a deflective portion of the vortex sensor for determining alternating fluid dynamic forces generated by vortex shedding from the vortex generator and experienced by the vortex sensor as a measure of fluid flow.

2. An apparatus as set forth in claim 1 wherein said combination includes means for closing said shut-off means when amplitude of signal from the transducer is smaller than a preset value and opening said shut-off means when the amplitude of the signal is greater than the preset value.

3. An apparatus as set forth in claim 1 wherein volume flow rate is determined from a combination of frequency of the alternating fluid dynamic forces and cross sectional area of open flow passages.

4. An apparatus as set forth in claim 1 wherein mass flow rate is determined from a combination of the frequency and amplitude of the alternating fluid dynamic forces and cross sectional are of open flow passages.

5. An apparatus as set forth in claim 4 wherein said combination includes means for exerting a lateral impulse of known magnitude on the vortex sensor in a direction generally perpendicular to the central axis of the bore and means for detecting amplitude of pulse from the transducer generated by said lateral impulse, wherein the ratio of the magnitude of the lateral impulse to the amplitude of the pulse is used as a calibration standard for determining the amplitude of the fluid dynamic forces from the amplitude of signals from the transducer.

6. An apparatus as set forth in claim 1 wherein the fluid density is determined as the ratio/mass flow rate to volume flow rate.

7. An apparatus for measuring fluid flow comprising in combination:

(a) a body including a bore extending from one extremity to the other extremity of the body;

(b) a divider planar member disposed generally parallel to the central axis of the bore and dividing the bore into two flow passages;

(c) a shut-off means for closing and opening one of said two flow passages;

(d) a vortex generator of an elongated cylindrical shape with at least one extremity secured to the body disposed across said two flow passages in a generally perpendicular relationship to the divider planar member and extending through a clearance opening disposed through the divider planar member wherein a gap between the vortex generator and boundary of the clearance opening allows communication of fluid pressure between the two flow passages; and (e) a transducer connected to a deflective portion of the vortex generator for determining alternating fluid dynamic forces generated by vortex shedding from the vortex generator and experienced by the vortex generator as a measure of fluid flow.

8. An apparatus as set forth in claim 7 wherein said combination includes means for closing said shut-off means when amplitude of signal from the transducer is smaller than a preset value and opening said shut-off means when the amplitude of the signal is greater than the preset value.

9. An apparatus as set forth in claim 7 wherein volume flow rate is determined from a combination of frequency of the alternating fluid dynamic forces and cross sectional area of open flow passages.

10. An apparatus as set forth in claim 7 wherein mass flow rate is determined from a combination of the frequency and amplitude of the alternating fluid dynamic forces and cross sectional are of open flow passages.

11. An apparatus as set forth in claim 10 wherein said combination includes means for exerting a lateral impulse of known magnitude on the vortex generator in a direction generally perpendicular to the central axis of the bore and means for detecting amplitude of pulse from the transducer generated by said lateral impulse, wherein the ratio of the magnitude of the lateral impulse to the amplitude of the pulse is used as a calibration standard for determining the amplitude of the fluid dynamic forces from the amplitude of signals from the transducer.

12. An apparatus as set forth in claim 7 wherein the fluid density is determined as the ratio of mass flow rate to volume flow rate.

13. An apparatus for measuring fluid flow comprising in combination:

(a) a body including a pair of flow passages;

(b) shut-off means for closing and opening first of said pair of flow passages;

(c) a vortex generator of an elongated cylindrical shape disposed across each of said pair of flow passages;

(d) a vortex sensor of a planar shape disposed across each of said pair of flow passages downstream of the vortex generator in a relationship generally parallel to the vortex generator on a plane parallel to the central axis of each of the pair of flow passages, wherein at least one extremity of the vortex sensor is secured to the body at least in part; and (e) a transducer connected to a deflective portion of the vortex sensor disposed in second of said pair of flow passages by a mechanical coupling for detecting alternating fluid dynamic forces generated by vortex shedding from the vortex generator and experienced by said vortex sensor as a measure of fluid flow.

14. An apparatus as set forth in claim 13 wherein said combination includes means for closing said shut-off means when amplitude of signal from the transducer is smaller than a preset value and opening said shut-off means when the amplitude of the signal is greater than the preset value.

15. An apparatus as set forth in claim 13 wherein volume flow rate is determined from a combination of frequency of the alternating fluid dynamic forces and cross sectional area of open flow passages.

16. An apparatus as set forth in claim 13 wherein mass flow rate is determined from a combination of the frequency and amplitude of the alternating fluid dynamic forces and cross sectional are of open flow passages.

17. An apparatus as set forth in claim 13 wherein the fluid density is determined as the ratio of mass flow rate to volume flow rate.

18. An apparatus for measuring fluid flow comprising in combination:

(a) a body including a pair of flow passages;

(b) shut-off means for closing and opening first of said pair of flow passages;

(c) a vortex generator of an elongated cylindrical shape with at least one extremity secured to the body disposed across each of said pair of flow passages; and (d) a transducer connected to a deflective portion of the vortex generator disposed in second of said pair of flow passages by a mechanical coupling for detecting alternating fluid dynamic forces generated by vortex shedding from said vortex generator and experienced by said vortex generator.

19. An apparatus as set forth in claim 18 wherein said combination includes means for closing said shut-off means when amplitude of signal from the transducer is smaller than a preset value and opening said shut-off means when the amplitude of the signal is greater than the preset value.

20. An apparatus as set forth in claim 18 wherein volume flow rate is determined from a combination of frequency of the alternating fluid dynamic forces and cross sectional area of open flow passages.

21. An apparatus as set forth in claim 18 wherein mass flow rate is determined from a combination of the frequency and amplitude of the alternating fluid dynamic forces and cross sectional are of open flow passages.

22. An apparatus as set forth in claim 18 wherein the fluid density is determined as the ratio of mass flow rate to volume flow rate.

23. An apparatus for measuring fluid flow comprising in combination:

(a) a first conduit with inlet and outlet sections secured to a support and connected to one another by a generally 360 degree loop midsection disposed on one side of a plane including said inlet and outlet sections, wherein a portion of first half and a portion of second half of the first conduit over-lap in a spaced relationship therebetween;

(b) a second conduit with inlet and outlet sections secured to a support and connected to one another by a generally 360 degree loop medsection disposed on the other side of said plane opposite to said one side, wherein a portion of first half and a portion of second half of the second conduit overlap in a spaced relationship therebetween, and the inlet sections and the outlet sections of the first and second conduits are respectively disposed in a side arrangement;

(c) means for exerting vibratory force onto said overlapping portions of the first and second conduits, said vibratory force generating relative flexural vibration in directions generally parallel to said plane between a combination of first halves of the first and second conduits and a combination of second halves of the first and second conduits;

(d) means for detecting difference in the flexural vibrations between said combination of first halves and said combination of second halves of the first and second conduits;

(e) shut-off means for opening and closing flow passage provided by the first conduit; and (f) means for determining mass flow rate through said apparatus from a combination of said difference in the flexural vibrations and cross sectional area of open flow passages provided by the first and second conduits.

24. An apparatus as set forth in claim 23 wherein said combination includes means for closing said shut-off means when said difference in the flexural vibrations is smaller than a preset value and opening said shut-off means when said difference in the flexural vibrations is greater than said preset value.

25. An apparatus for measuring fluid flow comprising in combination:

(a) two conduits disposed generally parallel to a plane in a generally parallel arrangement with respect to one another wherein two extremities of each of said two conduits are secured to a support;

(b) means for exerting vibratory force onto midsections of said two conduits, said vibratory force generating relative flexural vibration in directions generally perpendicular to said plane between said two conduits;

(c) means for detecting difference in the relative flexural vibrations between first halves and second halves of combination of said two conduits;

(d) shut-off means for opening and closing flow passages provided by one of said two conduits; and (e) means for determining mass flow rate through said apparatus from a combination of said difference in the relative flexural vibrations and cross sectional area of open flow passages provided by said two conduits.

26. An apparatus as set forth in claim 25 wherein said combination includes means for closing said shut-off means when said difference in the flexural vibrations is smaller than a preset value and opening said shut-off means when said difference in the flexural vibrations is greater than said preset value.

* * * * *